Patented Aug. 8, 1944

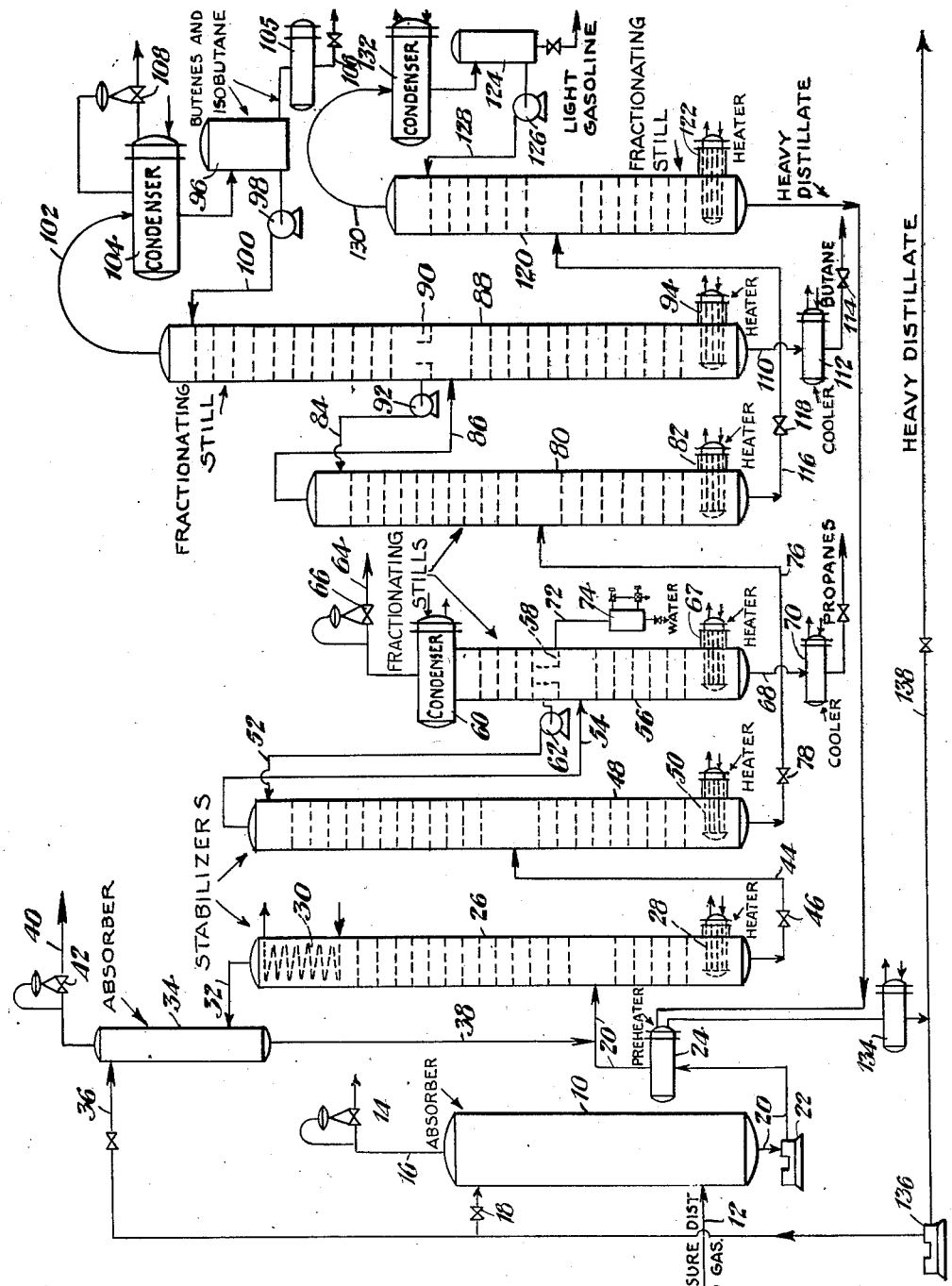

2,355,589

UNITED STATES PATENT OFFICE 2,355,589

METHOD OF RECOVERY OF LIGHT HYDROCARBONS

David G. Brandt, Westfield, N. J., assignor to Cities Service Oil Company, New York, N. Y., a corporation of Pennsylvania Application January 22, 1942, Serial No. 427,765

3 Claims. (Cl. 62—175.5)

This invention relates to an improved process for recovering and separating desired volatile hydrocarbons from mixtures thereof with lower and higher boiling constituents such as occur in natural gas and in the pressure distillates of a petroleum cracking operation. This application is a continuation-in-part of and an improvement on the disclosures of applicant's pending applications Serial No. 225,079, filed August 16, 1938, and Serial No. 371,929, filed December 27, 1940.

No presently known commercial method for separating desired liquefiable hydrocarbons such as $C_3$ hydrocarbons from natural gas or cracking still overhead products is operatable to effect substantially complete separation and recovery of the $C_3$ hydrocarbons. The successive oil absorption and distillation steps whereby $C_3$ hydrocarbons are partially separated by present known methods are not adapted to the problem of effecting high substantially complete recovery of $C_3$ hydrocarbons, primarily because the initial absorption operation is not selective and effects absorption of considerable quantities of undesired $C_1$ and $C_2$ hydrocarbons. The thus absorbed $C_1$ and $C_2$ hydrocarbons interfere with the presently used methods for recovering the absorbed $C_3$ hydrocarbon vapors liberated from the absorption oil by liquefaction and rectification, and any attempt to effect substantially complete recovery of $C_3$ hydrocarbons would require excessive reabsorption and rectification operations.

A primary object of the present invention is to provide an efficient and economical process which is adapted for effecting the separation and substantially complete recovery and purification of light hydrocarbons such as $C_3$ and $C_4$ hydrocarbons from mixtures thereof with higher boiling hydrocarbons and with undesired $C_1$ and $C_2$ hydrocarbons.

As pointed out in application Serial No. 371,929, it is practically impossible by present known methods to make a direct fractionation of a mixture of such hydrocarbons and to separate the $C_1$ and $C_2$ from the $C_3$ and higher hydrocarbons at the high pressures and normal water condensing temperatures which are desirable for the economical handling of such hydrocarbon mixtures. When a hydrocarbon mixture containing $C_2$ and $C_3$ hydrocarbons is subjected to fractionation under a pressure of the order of 500 pounds per square inch, a considerable amount of $C_3$ hydrocarbons must inevitably be removed overhead with the $C_2$ hydrocarbons because the $C_3$ hydrocarbons are so near their critical temperature and pressure conditions that practically no heat of vaporization is required to distil them over.

It was further observed in application Serial No. 371,929 that in effecting preliminary separation of the undesired $C_1$ and $C_2$ hydrocarbons from the absorption oil by rectification, it is necessary to use a reflux containing $C_3$ hydrocarbons, and thereby develop partial pressure effects which insure efficient removal of the undesired hydrocarbons without developing the critical conditions which prevent efficient separation where only $C_2$ hydrocarbon reflux is available. According to the disclosure of that application an efficient high recovery of desired hydrocarbons including $C_3$ hydrocarbons can be obtained while carrying out the preliminary complete separation of $C_1$ and $C_2$ hydrocarbons by selectively reabsorbing $C_3$ hydrocarbon vapors removed overhead from such preliminary rectification treatment, under high pressure, and returning the thus reabsorbed $C_3$ hydrocarbons to the rectification zone.

In accordance with the present invention the preliminary absorption operation is preferably carried out at the gas supply pressure and at a comparatively low temperature to give the heavy gasoline or other absorption oil full opportunity for selective absorption of the desired hydrocarbons and for selective rejection of most of the undesired hydrocarbons. The stabilizing operation on the enriched absorption oil is preferably carried out under a comparatively high pressure not substantially below 500 pounds, and under conditions of temperature and reflux such as to separate substantially all the undesired hydrocarbons from the rich absorber oil.

In successive distillation stages the pressure is gradually dropped while successively separating $C_3$ hydrocarbons in the second stage, $C_4$ hydrocarbons in the third stage, and light gasoline in the final stage; after which the heavy denuded gasoline residue or absorption oil may be recycled to the primary and second absorbers.

With the above and other objects and features in view, the invention consists in the hydrocarbon extraction and purification process which is hereinafter described and particularly defined in the claims.

In the following description of the invention, reference will be had to the attached drawing, which is a flow sheet of apparatus adapted for carrying out the process of the present invention in its preferred form.

Referring to the drawing, the hydrocarbon mixture to be treated, which may be natural gas or the pressure distillate and gas mixture from a petroleum cracking operation, and which may comprise hydrocarbons boiling in the gasoline range as well as both lower and higher boiling hydrocarbons, is introduced into the lower portion of an absorber 10 through a line 12, preferably after being cooled. Uncondensed gaseous hydrocarbon constituents of the mixture introduced into the absorber through the line 12 pass upwardly through the absorber in countercurrent contact with an absorption oil which is introduced into the upper part of the absorber through a valved connection 18. Absorber 10 is preferably operated under a pressure and temperature so chosen that propane, propylene and higher molecular weight hydrocarbons are absorbed and that ethane and lower molecular weight gases are discharged from the top of the absorber through a line 16 past a pressure-controlled relief valve 14. Absorber 10 is normally operated under a pressure within the range 100-400 pounds per square inch, although a higher operating pressure for the absorber may sometimes be used in processing high pressure natural gas. The absorption oil which is introduced into the absorber 10 may comprise any suitable oil adapted to perform the absorption operation. In treating pressure distillate the absorption oil may be a product of the treatment comprising a high boiling point mixture of hydrocarbons obtained as a residue of the treatment after stabilization and fractionation of the distillate.

The rich absorption oil which collects at the bottom of the absorber 10 mixes there directly with any liquid hydrocarbon introduced through the line 12, and the resulting mixture is withdrawn through a draw-off 20 and forced by means of a pump 22 at a high pressure of say 500-600 pounds per quare inch through a preheater 24 and then into a stabilizing column 26, preferably at an intermediate point thereof. A rectifying operation is carried out within the stabilizer 26 for the purpose of distilling off undesired gaseous hydrocarbons including ethane and ethylene and lower weight molecular constituents from the hydrocarbon mixture, in order to produce a stabilized residual product which is substantially free from such undesired gaseous constituents and which can therefore be fractionated effectively and rapidly in subsequent operating steps. The hydrocarbon mixture which is introduced to the stabilizer 26 is preferably preheated in exchanger 24 to a temperature in the range 250-300° by heat exchange with the heavy pressure distillate or absorption oil, and rectification thereof proceeds at the pressure indicated. In carrying out the fractionation in column 26, the bottom of the column is heated by means of a heater 28 to maintain the necessary temperature therein, as for example 375° F. At the same time the top of the column 26 is preferably cooled by means of a cooling coil 30 to produce a refluxing action.

Under the specified pressure and temperature conditions for the operation of the column 26 it is practically impossible to make a clean separation between the $C_3$ and the $C_2$ hydrocarbons, because at the high operating pressures specified the cooling and refluxing must be carried on by a mixture of $C_2$ and $C_3$ hydrocarbons for efficient reflux. The overhead vapor fraction which is produced by stabilizer 26 in accordance with the present process comprises methane and the $C_2$ hydrocarbons ethane and ethylene, and also some $C_3$ hydrocarbons and even some isobutane or other $C_4$ hydrocarbons. This overhead vapor mixture leaves the top of the column 26 through a vapor line 32 and enters the lower end of an absorber 34 which is operated at a pressure substantially the same as the operating pressure of the stabilizer 26. The pressure in the absorber 34 need only be slightly lower than that of the operating pressure of stabilizer 26 to allow for vapor flow from the top of stabilizer 26 into absorber 34.

The absorption oil which is used in absorber 34 may be the same as that supplied to the absorber 10 and therefore may be introduced into the top of the absorber 34 through a valved extension 36 of line 18. This absorption oil as introduced into the absorbers 10 and 34, may be precooled to a relatively low temperature. The rich absorption oil which collects at the bottom of the absorber 34 is removed through a draw-off line 38 and is introduced into stabilizing column 26 either through feed line 20, or at a point farther up the column. If necessary a pump may be provided in the line 38, or the absorber 34 may be elevated as shown, to obtain gravity flow into the column 26. The absorption oil is supplied to the absorber 34 at a rate and temperature which is adapted to absorb substantially all of the desired hydrocarbons in the mixture removed from the stabilizer. Such desired hydrocarbons may include all $C_3$ and higher hydrocarbons present in the vapor or gas stream entering the absorber through line 32. The function of the absorber 34 is, therefore, to recover these desired $C_3$ and higher hydrocarbons which would otherwise be lost, and to return such hydrocarbons to the stabilizing column 26, thereby recovering the maximum quantity of the desired $C_3$ hydrocarbons. Unabsorbed $C_2$ hydrocarbons and gases reaching the top of absorber 34 are discharged from the system through a line 40 under the control of a relief valve 42.

The mixture of hydrocarbons which collects at the bottom of the stabilizing column 26 as a result of the operations heretofore described should be substantially free of any undesired $C_2$ hydrocarbons or lower molecular weight constituents. The operating temperatures for the top and bottom of the column are specifically designed to effect this result. The hydrocarbon mixture is withdrawn from the foot of the column 26 through a line 44, past a pressure relief valve 46, and is conducted to the first column 48 of a series of stabilizing and fractionating columns wherein the mixture may be fractionated to produce desired individual fractions, such as, for example, a propane-propylene fraction, a normal butane fraction, a butene-iso-butane fraction, a light gasoline fraction, and a heavy gasoline or higher boiling distillate residue which may be recycled as an absorption oil to the absorbers 10 and 34. The stage fractionation to accomplish the desired result is greatly simplified and much more easily and economically effected because of the absence of all but possible traces of ethane, ethylene and lower molecular weight constituents in the material which is delivered to the fractionating system through the line 44.

By reason of substantially complete removal of $C_1$ and $C_2$ hydrocarbons from the rich absorption oil or distillate bottoms product of the stabilizing operation in tower 26, it is possible to treat such product to a second stabilizing operation in tower 48 under conditions of greatly reduced pressure and heavy reflux adapted to fractionally distill overhead substantially all of the $C_3$ hydrocarbons without substantial removal of butane or other $C_4$ hydrocarbons. Heat for this second stabilizing operation is supplied by a heating coil 50 located at the bottom of tower 48. The vapors liberated by distillation thus carried out within the tower 48 pass upwardly through filling of bubble trays therein countercurrent to reflux condensate introduced by a reflux return line 52.

$C_3$ hydrocarbon vapors leaving the top of tower 48 pass by a line 54 into the midzone of a fractionating still 56 at a point just below a condensate trap plate 58. Column still 56 is operated to remove the last trace of $C_2$ hydrocarbon by venting at valve 66. The lower portion of still 56 is operated as a propane reboiler, while the upper portion of the still is operated as a propane vapor condenser developing reflux for use in tower 48.

By reason of the fact that the vapors entering still 56 are substantially free of $C_2$ hydrocarbons, it is possible to operate condenser 60 at the top of tower 56 to establish substantially equilibrium condensation, without overloading or fouling the condenser. The $C_3$ hydrocarbons thus condensed in the upper portion of still 56 collect on tray 58 and part of this product is returned as reflux to the tower 48 by a pump 62. Heat for the reboiling operation in the lower portion of still 56 is supplied by a coil heater 67. The purified $C_3$ hydrocarbon or propane fraction is removed from the base of the still 56 through a line 68 and a cooler 70, to storage. Any water vapor extracted by the hydrocarbon oil from the gas passed through absorbers 10 and 34 is driven off overhead along with the propane vapors from tower 48 and condenses in the upper part of still 56, where it is collected as a bottom layer under the reflux liquid on trap tray 58. This water is drawn off through a line 72 into an accumulator 74, from which it is removed.

The rich absorption oil or distillate which collects as a bottom product in the base of column 48 is removed through a line 76, past a pressure reducing valve 78, into the mid-zone of a third stabilizer or fractionating tower 80. Tower 80 is operated to remove $C_4$ hydrocarbons from the absorber oil, including all butenes, isobutane and any excess normal butane not necessary for the vapor requirements of the light gasoline which is to be subsequently extracted from the absorption oil. Heat required for liberating the $C_4$ hydrocarbons from the absorption oil is supplied by the coils of a heater 82 located at the base of tower 80. The tower 80 is operated at a greatly reduced pressure and under reflux and temperature conditions adapted for effecting removal of predetermined proportions of the butane along with all of the isobutane and butene fractions. Reflux for operating the tower is introduced into the top of the tower through a line 84. The fractionated $C_4$ hydrocarbon vapors leave the top of the tower 80 through line 86 and enter the midzone of a fractionating still 88 just below a reflux trap 90. The reflux condensate which is introduced into the top of still 80 is a part of the condensate produced by condensing vapors in the upper portion of tower 88 and in a vapor condensing and reflux return system operatively connected with the top of tower 88. The reflux thus produced in the top of tower 88 is returned to tower 80 by a reflux return pump 92.

Tower 88 is operated as a rectifying still to separate all of the butenes and isobutane from the normal butane which is present in the vapors charged to the column. Heat for carrying out the fractionation and reboiling within tower 88 is supplied by a tubular heater 94 located at the base of the tower. Vapors of $C_4$ hydrocarbons leave the top of tower 88 through a vapor line 102 and are condensed by a condenser 104. The condensate is collected in a receiver 96 from which reflux condensate is returned to the top of tower 88 by a reflux return pump 98 and reflux return line 100. Any condensate not returned as reflux is passed to storage or further refining through a cooler 105 and a valved draw-off line 106. As previously indicated, this condensate includes the isobutane and butenes. The temperature of the condenser 104 is regulated by a thermostatic valve 108 which in turn controls the supply of cooling fluid to the condenser 104. The normal butane which collects at the bottom of tower 88 is withdrawn through a line 110 and a cooler 112 past a drawoff valve 114 to storage.

After being stripped of undesired gaseous hydrocarbons and desired light $C_3$ and $C_4$ hydrocarbons by the treatment in stabilizer columns 26, 48 and 80, the absorption oil or distillate is withdrawn from the bottom of tower 80 through a line 116, past a reducing valve 118, into the mid-portion of a final fractionating still 120 which is preferably operated at substantially atmospheric pressure. Heat for the operation within still 120 is supplied by a coil heater 122, and the still is operated to distill off overhead all light gasoline hydrocarbons from the absorption oil or heavy distillate preparatory to return of the absorption oil or distillate heavy gasoline as an absorption menstruum to the absorbers 10 and 34 for reuse therein. Fractional distillation is carried out within still 120 with the aid of reflux returned thereto from a light gasoline receiving tank 124 by a reflux return pump 126 and a return line 128. Light gasoline vapors leave the top of still 120 through a line 130 and are condensed by passing through a condenser 132, the condensate collecting in receiver 124. Stripped heavy gasoline or other absorber oil is removed from the base of the still 120 and may be passed through heat exchange coils in preheater 24 and in a cooler 134, on the way to the intake of a pump 136. Pump 136 is used to force the denuded absorber oil through lines 18 and 36 to the primary and secondary absorbers.

Since the heavy gasoline which remains in the bottom of still 120 is one of the products of the distillate operation, there is always some excess thereof produced over and above that amount which may be employed as absorber oil in cyclic circulation through the apparatus. Any excess heavy distillate not required as absorber oil is withdrawn to storage through valved line 138. This absorption oil may contain all hydrocarbon products of the process between the end boiling point of the light gasoline taken off overhead from still 120 and the end point of the heavy ends of the product entering the absorber 10, which may be up to 650° F. The pump 136 of course operates to raise the pressure of the recycled absorption oil to a pressure corresponding to the operating pressure of the secondary absorber 34 (approximately 500 lbs.). For this reason a valve is provided in the inlet pipe 18 to absorber 10 since the operating pressure of this absorber is considerably lower than that of absorber 34. However, these oils may be delivered to each absorber by two separate pumps.

As previously indicated, the preferred operating pressure for the primary absorber 10 is in the neighborhood of 200 lbs., and that of the first stabilizer 26 and the secondary absorber about 500 lbs. The second stabilizer 48 may then be operated at about 250 lbs., and the third stabilizer or fractionator 80 at about 100 lbs., with the final stripping still 120 operating at or near atmospheric pressure.

An advantage of the hydrocarbon extraction process herein described is that the entire system is operable without requiring the use of compressors for compressing gaseous hydrocarbons from a low pressure to a high pressure. Even the undesired hydrocarbons which are absorbed in the primary absorber have their pressure raised to the pressure of subsequent stabilizing operations by means of the liquid pump 22. All subsequent handing of fluids in the process is effected without the use of compressors, either by carrying out the operation at a pressure below that of the preceding operation in the cycle, or by using other liquid pumps such as the reflux return pumps 62, 92, 98 and 126.

The invention having been thus described, what is claimed as new is:

1. In the fractionation of hydrocarbon mixtures containing $C_3$ and $C_4$ hydrocarbons and hydrocarbons of gasoline boiling range in which the fractionation is carried out for the purpose of producing $C_3$ and $C_4$ fractions which are substantially free of constituents of higher and lower molecular weight, the improvement which comprises passing a hydrocarbon mixture to be fractionated containing $C_3$, $C_4$ and gasoline boiling range hydrocarbons which is substantially free of but contains traces of $C_2$ hydrocarbon into a fractionating column in which the mixture is subjected to rectification under controlled temperature and pressure conditions adapted to produce a bottoms product substantially free of $C_2$ and $C_3$ hydrocarbons and overhead vapor fraction consisting essentially of $C_3$ and $C_2$ hydrocarbons but which is substantially free of $C_4$ hydrocarbon, introducing the said vapor fraction directly into the midportion of a second fractionating column in which the vapor mixture is rectified under conditions adapted to eliminate the $C_2$ hydrocarbon overhead, withdrawing a $C_3$ hydrocarbon condensate from said second fractionating column at a point above the point of introduction of said vapor fraction and introducing it into the top of said first-mentioned fractionating column to provide reflux therefor, withdrawing a substantially pure $C_3$ hydrocarbon liquid fraction from the bottom of said second column, passing the bottoms product from said first-mentioned fractionating column consisting essentially of $C_4$ and higher molecular weight hydrocarbons into a third fractionating column and therein rectifying the same under conditions adapted to remove overhead a vapor fraction consisting essentially of $C_4$ hydrocarbon, passing the $C_4$ hydrocarbon vapor fraction into the midportion of a fourth fractionating column and therein rectifying the vapor mixture under conditions adapted to produce an overhead $C_4$ fraction which is substantially free of normal butane, withdrawing a condensate from said fourth fractionating column at a point above the point of introduction of said $C_4$ hydrocarbon vapor fraction and introducing it into the upper portion of said third fractionating column to provide reflux therein.

2. In the fractionation of hydrocarbon mixtures containing $C_3$ and $C_4$ hydrocarbons and hydrocarbons of gasoline boiling range in which the fractionation is carried out for the purpose of producing $C_3$ and $C_4$ fractions which are substantially free of constituents of higher and lower molecular weight, the improvement which comprises passing a hydrocarbon mixture to be fractionated containing $C_3$, $C_4$ and gasoline boiling range hydrocarbons which is substantially free of but contains traces of $C_2$ hydrocarbon into a fractionating column in which the mixture is subjected to rectification under controlled temperature and pressure conditions adapted to produce a bottoms product substantially free of $C_2$ and $C_3$ hydrocarbons and an overhead vapor fraction consisting essentially of $C_3$ and $C_2$ hydrocarbons but which is substantially free of $C_4$ hydrocarbon, introducing the said vapor fraction directly into the midportion of a second fractionating column in which the vapor mixture is rectified under conditions adapted to eliminate the $C_2$ hydrocarbon overhead, withdrawing a liquid $C_3$ hydrocarbon fraction from the bottom of said second column, passing the bottoms product from said first-mentioned fractionating column which is substantially free of $C_2$ and $C_3$ hydrocarbons into a third fractionating column and therein rectifying the same under conditions adapted to remove overhead a vapor fraction consisting essentially of $C_4$ hydrocarbon, passing the $C_4$ hydrocarbon vapor fraction into the midportion of a fourth fractionating column and therein rectifying the vapor mixture under conditions adapted to produce an overhead $C_4$ fraction which is substantially free of normal butane, withdrawing a condensate from said fourth fractionating column at a point above the point of introduction of said $C_4$ hydrocarbon vapor fraction and introducing it into the upper portion of said third fractionating column to provide reflux therein.

3. In the fractionation of hydrocarbon mixtures containing $C_3$ and $C_4$ hydrocarbons and hydrocarbons of gasoline boiling range in which the fractionation is carried out for the purpose of producing a $C_3$ fraction which is substantially free of constituents of higher and lower molecular weight, the improvement which comprises passing a hydrocarbon mixture to be fractionated containing $C_3$, $C_4$ and gasoline boiling range hydrocarbons which is substantially free of but contains traces of $C_2$ hydrocarbon into a fractionating column in which the mixture is subjected to rectification under controlled temperature and pressure conditions adapted to produce a bottoms product free of $C_2$ and $C_3$ hydrocarbons and an overhead vapor fraction consisting essentially of $C_3$ hydrocarbon and some $C_2$ hydrocarbon but which is free of $C_4$ hydrocarbon, introducing the said vapor fraction directly into the midportion of a second fractionation column in which the vapor mixture is rectified under refluxing conditions adapted to eliminate the $C_2$ hydrocarbon overhead, withdrawing a $C_3$ hydrocarbon condensate from said second fractionating column at a point above the point of introduction of said vapor fraction and introducing it into the top of said first-mentioned fractionating column to provide reflux therefor, discharging $C_2$ hydrocarbon from the top of the second column, withdrawing a substantially pure $C_3$ hydrocarbon liquid fraction from the bottom of said second column, and withdrawing $C_4$ and gasoline boiling range hydrocarbons from the bottom of the first column for further fractionation of the heavier hydrocarbons.

DAVID G. BRANDT.